United States Patent
Mo et al.

(10) Patent No.: US 12,289,003 B2
(45) Date of Patent: Apr. 29, 2025

(54) BATTERY CHARGING SYSTEM CONFIGURED TO INTERRUPT BUILDUP OF CARBON DEPOSITS AND CORRESPONDING METHOD

(71) Applicant: Ford Global Technologies, LLC, Dearborn, MI (US)

(72) Inventors: Richard Mo, Canton, MI (US); Timothy Harris, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 501 days.

(21) Appl. No.: 17/838,387

(22) Filed: Jun. 13, 2022

(65) Prior Publication Data

US 2023/0402860 A1    Dec. 14, 2023

(51) Int. Cl.
*H02J 7/00*    (2006.01)
*B60L 53/30*    (2019.01)

(52) U.S. Cl.
CPC ............ *H02J 7/0042* (2013.01); *B60L 53/30* (2019.02)

(58) Field of Classification Search
CPC ............................... H02J 7/0042; B60L 53/30
USPC ......................................................... 320/109
See application file for complete search history.

(56) References Cited

U.S. PATENT DOCUMENTS

| | | | |
|---|---|---|---|
| 6,067,231 A | 5/2000 | Lu | |
| 6,233,816 B1 | 5/2001 | Franke et al. | |
| 6,498,708 B2 | 12/2002 | Schilloff et al. | |
| 7,139,177 B2 | 11/2006 | Gottlieb | |
| 11,486,929 B1* | 11/2022 | Curtis | G01R 31/3278 |
| 2002/0001161 A1* | 1/2002 | Schilloff | H05K 1/0254 |
| | | | 361/127 |
| 2006/0271336 A1* | 11/2006 | Murphy | B60L 3/0023 |
| | | | 702/183 |
| 2009/0027824 A1* | 1/2009 | Allen | H01H 9/56 |
| | | | 361/170 |
| 2013/0108894 A1 | 5/2013 | Jung | |
| 2016/0272074 A1* | 9/2016 | McGrath | B60L 7/12 |
| 2018/0158633 A1* | 6/2018 | Brandt | G01R 31/3278 |
| 2023/0090245 A1* | 3/2023 | Zhong | H01H 50/18 |
| | | | 335/185 |
| 2023/0179011 A1* | 6/2023 | Liang | B60L 3/00 |
| | | | 323/284 |
| 2024/0128865 A1* | 4/2024 | Schmitz | H02H 3/006 |

* cited by examiner

Primary Examiner — Jack Chiang
Assistant Examiner — Suchin Parihar
(74) Attorney, Agent, or Firm — David B. Kelley; Carlson, Gaskey & Olds, P.C.

(57) ABSTRACT

This disclosure relates to a battery charging system configured to selectively charge a battery pack of an electrified vehicle. More particularly, the battery charging system is configured to interrupt a buildup of carbon deposits. A corresponding method is also disclosed. In some aspects, the techniques described herein relate to interrupting a buildup of carbon deposits on a printed circuit board of a battery charging system configured to selectively charge a battery pack of an electrified vehicle, wherein the buildup of carbon deposits follows a path between an input pin of a relay on the printed circuit board and an output pin of the relay, and wherein the buildup of carbon deposits are interrupted by a slot formed in the printed circuit board.

19 Claims, 5 Drawing Sheets

BATTERY CHARGING SYSTEM CONFIGURED TO INTERRUPT BUILDUP OF CARBON DEPOSITS AND CORRESPONDING METHOD

TECHNICAL FIELD

This disclosure relates to a battery charging system configured to selectively charge a battery pack of an electrified vehicle. More particularly, the battery charging system is configured to interrupt a buildup of carbon deposits. A corresponding method is also disclosed.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle. A high voltage battery pack typically powers the electric machines and other electrical loads of the electrified vehicle.

SUMMARY

In some aspects, the techniques described herein relate to a method, including: interrupting a buildup of carbon deposits on a printed circuit board of a battery charging system configured to selectively charge a battery pack of an electrified vehicle, wherein the buildup of carbon deposits follows a path between an input pin of a relay on the printed circuit board and an output pin of the relay, and wherein the buildup of carbon deposits are interrupted by a slot formed in the printed circuit board.

In some aspects, the techniques described herein relate to a method, wherein the interrupting step occurs after an expulsion event in which carbon is expelled from the relay and onto the printed circuit board.

In some aspects, the techniques described herein relate to a method, wherein the path is a substantially linear path between the input pin and the output pin.

In some aspects, the techniques described herein relate to a method, wherein the slot is at least 0.03 inches wide.

In some aspects, the techniques described herein relate to a method, wherein the slot is between 0.05 inches and 0.09 inches wide.

In some aspects, the techniques described herein relate to a method, wherein the slot is at least 0.15 inches long.

In some aspects, the techniques described herein relate to a method, wherein the slot extends through an entirety of a thickness of the printed circuit board.

In some aspects, the techniques described herein relate to a method, wherein the battery charging system includes a housing, and the printed circuit board and the relay are within the housing.

In some aspects, the techniques described herein relate to a method, wherein the housing includes a collection area on an opposite side of the printed circuit board as the relay, and the collection area is free of electronic components.

In some aspects, the techniques described herein relate to a method, wherein the housing is mounted to a wall.

In some aspects, the techniques described herein relate to a method, wherein the housing is part of a portable battery charging system.

In some aspects, the techniques described herein relate to a method, wherein, in normal conditions, the relay is configured to transfer power from a power source to the battery pack.

In some aspects, the techniques described herein relate to a method, wherein the relay is one of two relays mounted to the printed circuit board, and wherein both relays are configured to transfer power from the power source to the battery pack, and wherein each of the relays includes a corresponding slot configured to interrupt a buildup of carbon deposits between corresponding input and output pins of the relays.

In some aspects, the techniques described herein relate to a battery charging system configured to selectively charge a battery pack of an electrified vehicle, including: a housing; a printed circuit board within the housing; and a relay mounted to the printed circuit board, wherein the relay includes an input pin and an output pin, wherein the printed circuit board includes a slot between the input pin and the output pin configured to interrupt a path formed by a buildup of carbon deposits on the printed circuit board that, in the absence of the slot, would otherwise provide an electrical connection between the input pin to the output pin.

In some aspects, the techniques described herein relate to a battery charging system, wherein the housing is mounted to a wall or part of a portable battery charging system.

In some aspects, the techniques described herein relate to a battery charging system, wherein the slot is at least 0.03 inches wide.

In some aspects, the techniques described herein relate to a battery charging system, wherein the slot is between 0.05 inches and 0.09 inches wide.

In some aspects, the techniques described herein relate to a battery charging system, wherein the slot is at least 0.15 inches long.

In some aspects, the techniques described herein relate to a battery charging system, wherein the slot extends through an entirety of a thickness of the printed circuit board.

In some aspects, the techniques described herein relate to a battery charging system, wherein, in normal conditions, the relay is configured to transfer power from a power source to the battery pack.

DETAILED DESCRIPTION

This disclosure relates to a battery charging system configured to selectively charge a battery pack of an electrified vehicle. More specifically, the battery charging system is configured to interrupt a buildup of carbon deposits. A corresponding method is also disclosed. This disclosure electrically isolates the pins of a relay in the event that carbon, or other potentially electrically conductive contaminants, are expelled from the relay. Additional benefits will be appreciated from a review of the below description.

Figure 1:
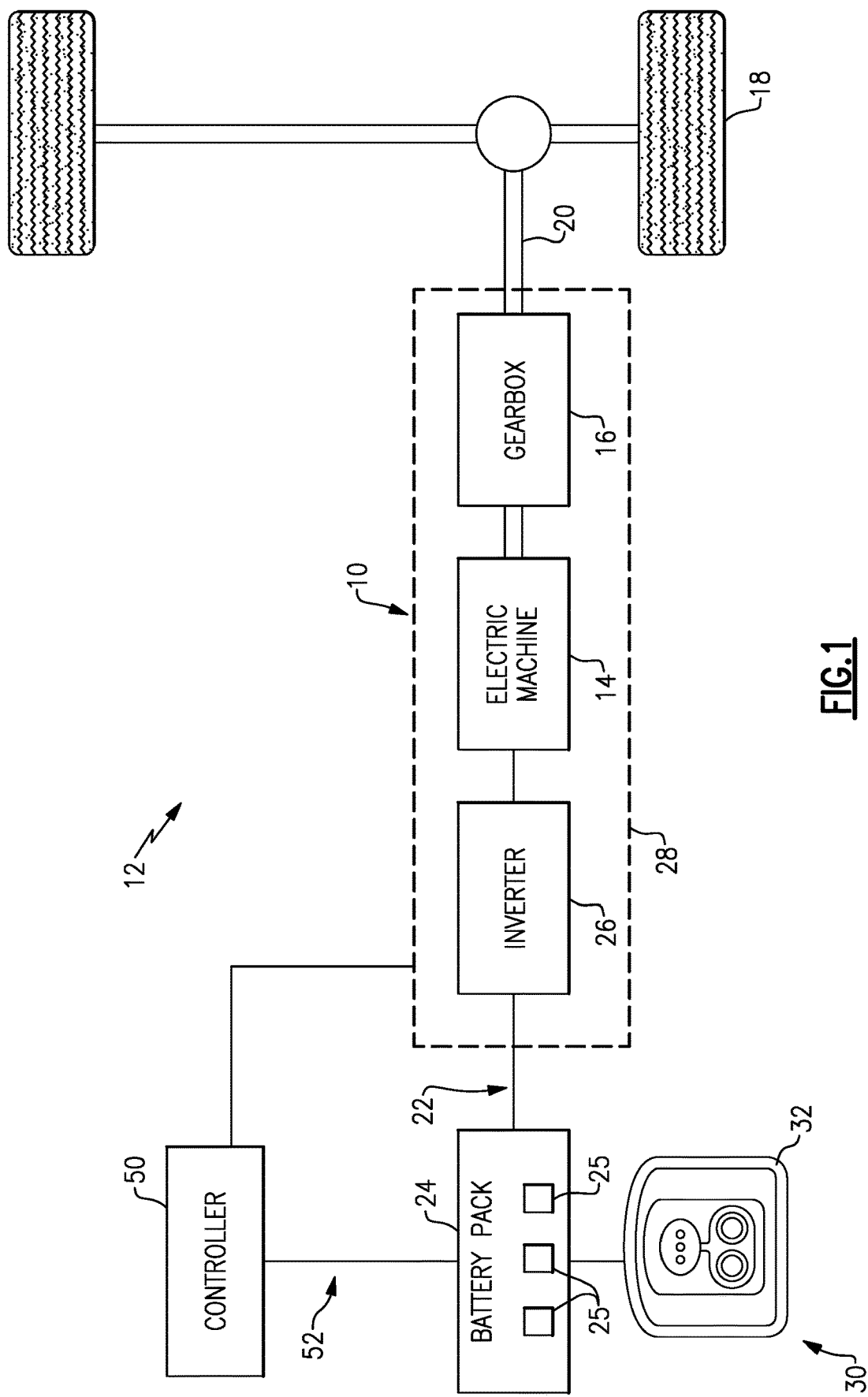
FIG. 1 schematically illustrates a powertrain and other components of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for periodically charging the energy storage devices (e.g., battery cells) of the battery pack 24. The charging system 30 may be connected to an external power source, such as a grid power source 48 (FIG. 2), for receiving and distributing power to the energy storage devices. For example, in one non-limiting embodiment, the charging system 30 includes a charging port 32 located on-board the electrified vehicle 12. The charging port 32 is adapted to selectively receive power from the external power source, such as from a power cable connected to the external power source, and then distribute the power to the battery pack 24 for charging the energy storage devices.

The charging system 30 may also be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
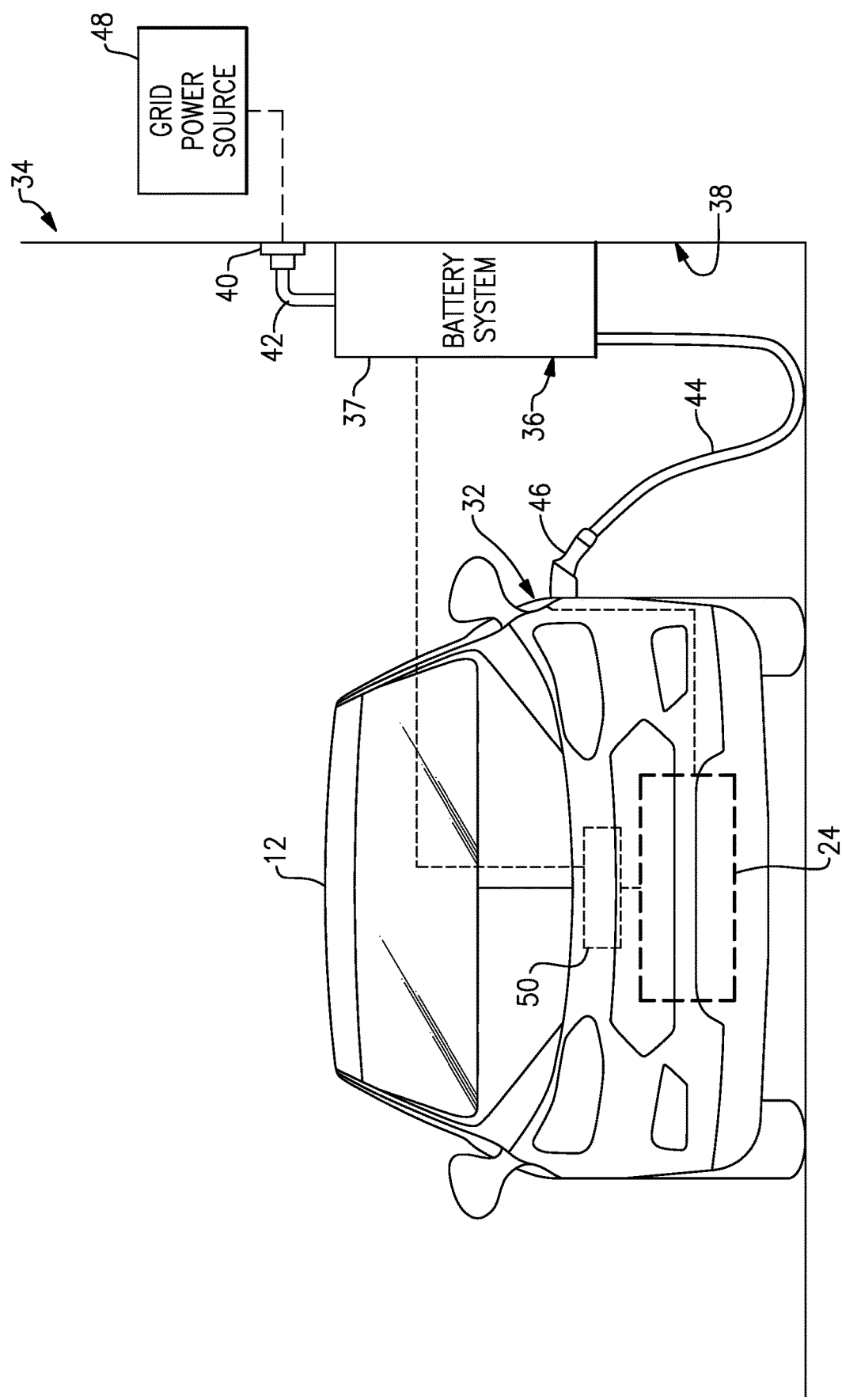
FIG. 2 shows an electrified vehicle incorporating the powertrain of FIG. 1 and located in a charging position relative to a battery charging system.

FIG. 2 schematically depicts the electrified vehicle 12 of FIG. 1 parked in a charging position near a structure 34. The structure 34 could be a residential building, a commercial building, a parking garage, or any other structure. In a non-limiting embodiment, the structure 34 is a garage located at the home of the owner/operator of the electrified vehicle 12. It should be understood that the various components of FIG. 2 are shown schematically to better illustrate the features of this disclosure and are not necessarily depicted to scale.

A battery charging system 36 for charging the battery pack 24 of the electrified vehicle 12 may be mounted to a surface 38, such as a wall or a floor, of the structure 34. In FIG. 2, the battery charging system 36 includes an external housing 37, which may include one or more pieces, mounted to the surface, which is a wall in this example. As such, the battery charging system 36 is considered a wall-mounted system. This disclosure extends to other battery charging systems, such as portable battery charging systems in which the housing 37 is not mounted to a surface such as a wall or floor.

The battery charging system 36 may be electrically coupled to a power outlet 40 by a first power cable 42. A second power cable 44 extends between the battery charging system 36 and the charging port 32 of the electrified vehicle 12. A vehicle coupler, or plug, 46 of the second power cable 44 is coupled to the charging port 32 to allow power to be transferred from the battery charging system 36 to the electrified vehicle 12, and more specifically to the battery pack 24 of the electrified vehicle 12.

A grid power source 48 can supply power to the battery charging system 36 once the first power cable 42 is connected to the power outlet 40. In a non-limiting embodiment, the grid power source 48 is an AC power source that inputs power to the battery charging system 36 at either 110 volts or 220 volts. The power supplied to the battery charging system 36 may be stored therein and then selectively used to charge the battery pack 24 of the electrified vehicle 12. Thus, the battery charging system 36 can be used to charge the battery pack 24 of the electrified vehicle 12 even when power is not available from the grid power source 48. While FIG. 2 illustrates one example battery system arrangement, this disclosure is not limited to the particular arrangement of FIG. 2.

With reference back to FIG. 1, the electrified vehicle 12 includes a controller 50 for monitoring and/or controlling various aspects of the powertrain 10 associated with the electrified vehicle 12. The controller 50, for example, may communicate with the battery pack 24, the charging system 30, and the charging port 32. The controller 50 may also communicate with various other vehicle components and monitor various other vehicle conditions. The controller 50 includes electronics, software, or both, to perform the necessary control functions for operating the electrified vehicle 12.

In one non-limiting embodiment, the controller 50 is a combination vehicle system controller and powertrain control module (VSC/PCM). Although it is shown as a single device, the controller 50 may include multiple controllers in the form of multiple hardware devices, or multiple software controllers with one or more hardware devices. A controller area network 52 (CAN) allows the controller 50 to communicate with the various components of the electrified vehicle 12 as well as the battery charging system 36.

Figure 3:
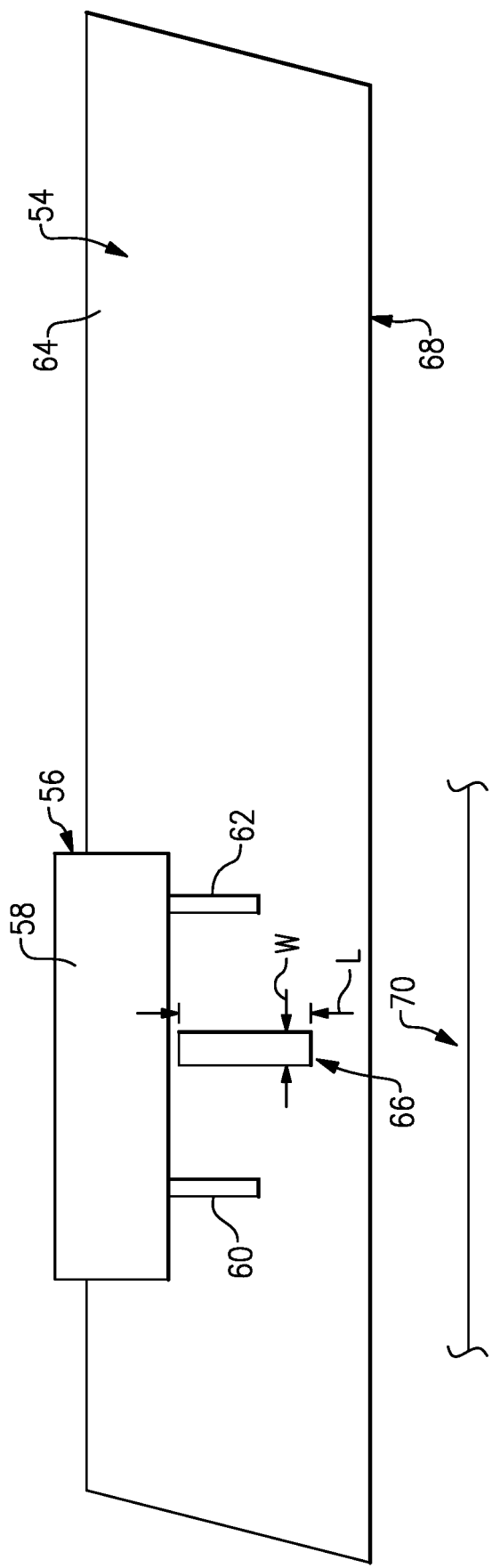
FIG. 3 illustrates an arrangement of a relay relative to a printed circuit board in a normal operating condition.

FIG. 3 illustrates, somewhat schematically, certain components arranged within the housing 37 of the battery charging system 36. Specifically, FIG. 3 illustrates a printed circuit board (PCB) 54 and a relay 56 mounted to the PCB 54. The relay 56 is provided by a known type of relay, and serves as an electrically operated switch. The relay 56 includes a main body 58 which contains a majority of the components of the relay 56, including contacts, armatures, yokes, electromagnets, switches, and/or springs that may be present in the relay 56. The relay 56 is a switch which, when closed, is configured to transfer power from a power source, such as the grid power source 48, to the second power cable 44 and plug 46, and ultimately to the battery pack 24.

The relay 56 further includes at least one input pin 60 and at least one output pin 62 both of which project from the main body 58 and electrically connect to the PCB 54. The main body 58 is spaced-apart from a surface 64 of the PCB 54 by the input and output pins 60, 62. The input and output pins 60, 62 are electrically connected to tracings on the PCB. While one input pin 60 and one output pin 62 is shown in FIG. 3, there could be additional input and output pins.

The PCB 54 includes a slot 66 between the input and output pins 60, 62. The slot 66 is sized and shaped to interrupt a path of surface contaminants, which may include carbon deposits, from forming that, in the absence of the slot 66, would otherwise provide an electrical connection between the input pin 60 and the output pin 62 via the surface 64 of the PCB 54 facing the main body 58.

In this example, the slot 66 extends through an entirety of a thickness of the PCB 54, namely from surface 64 to the opposite surface 68 of the PCB 54. The slot 66 exhibits a width W and a length L in this example. The width W is measured in a direction parallel to a straight line between the input and output pins 60, 62, and the length L is measured perpendicular to the width W. In this disclosure, width W is at least 0.03 inches (0.762 mm), and in a particular example is between 0.05 inches (1.27 mm) and 0.09 inches (2.286 mm). The length L is at least 0.15 inches (3.81 mm). The width W is such that contaminants expelled from the main body 58 of the relay 56 cannot build up, by depositing contaminants on additional, previously-deposited contaminants, and bridge the width of the slot 66. At the same time, the width W is not so great that the slot 66 is difficult to manufacture or such that the PCB 54 cannot support the relay 56. The length L is of a distance that contaminants expelled from the main body 58 cannot extend around the slot 66, without being so great that the slot 66 is difficult to manufacture. The width W and length L, both individually and together, provide a benefit in this disclosure. Further, it should be noted that the width W and length L are intentionally not designed to be optimized for heat dissipation (i.e., to dissipate heat that may be generated by the relay 54), but are instead sized and shaped to prevent contaminant buildup in an expulsion event.

The housing 37 further includes a collection area 70 aligned with the slot 66 and on an opposite side of the slot 66 as the main body 58 of the relay 56. The collection area 70 faces the surface 68. The collection area 70 may be a surface of the housing 37. In the collection area 70, there are no electronic components. The collection area 70 may be sized, shaped, and/or configured to collect surface contaminants and contain those contaminants within the collection area 70. The collection area 70 is made of or lined with an electrically insulative material, in one example, such as plastic.

Figure 4:
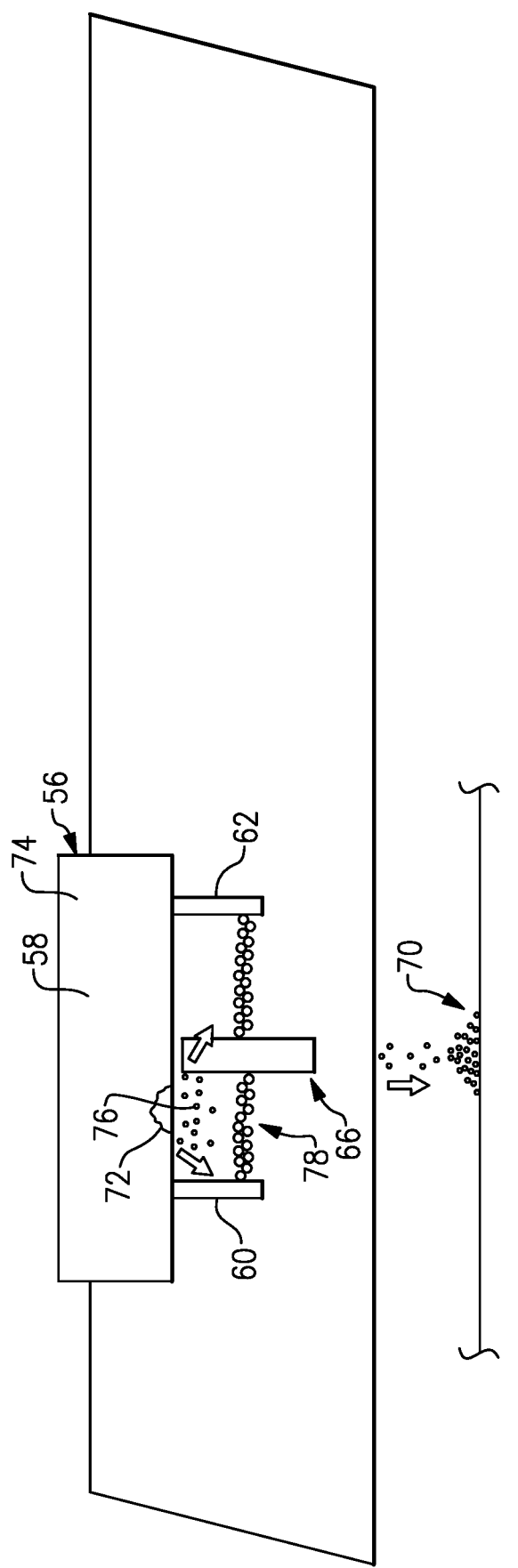
FIG. 4 is a view similar to FIG. 3 during an expulsion event.

FIG. 3 illustrates the relay 56 in normal operating conditions. FIG. 4 illustrates the relay 56 during an expulsion event in which contaminants, such contaminants that include carbon, are expelled from the main body 58. The event depicted in FIG. 4 is not a normal operating condition. The event may include a short circuit within the relay 56.

In FIG. 4, an area 72 of an exterior housing 74 of the main body 58 has opened, and contaminants 76 are being expelled toward the surface 64. The contaminants 76, in this example, are laid on the surface 64 and begin to build up and form a substantially linear path 78 between the input and output pins 60, 62. The slot 66, however, interrupts the path 78 such that the contaminants 76 are prevented from creating an electrical connection between the input and output pins 60, 62. In this way, the slot 66 interrupts the path 78 and the buildup of the contaminants 76 between the input and output pins 60, 62. Contaminants 76 expelled toward the slot 66 pass through the slot 66 and collect in the collection area 70. The contaminants 76 within the collection area 70 do not interfere with other electronics within the housing 37. While the path 78 is shown as a substantially linear path, the slot 66 also prevents non-linear paths of built-up contaminants from electrically connecting the input and output pins 60, 62.

Figure 5:
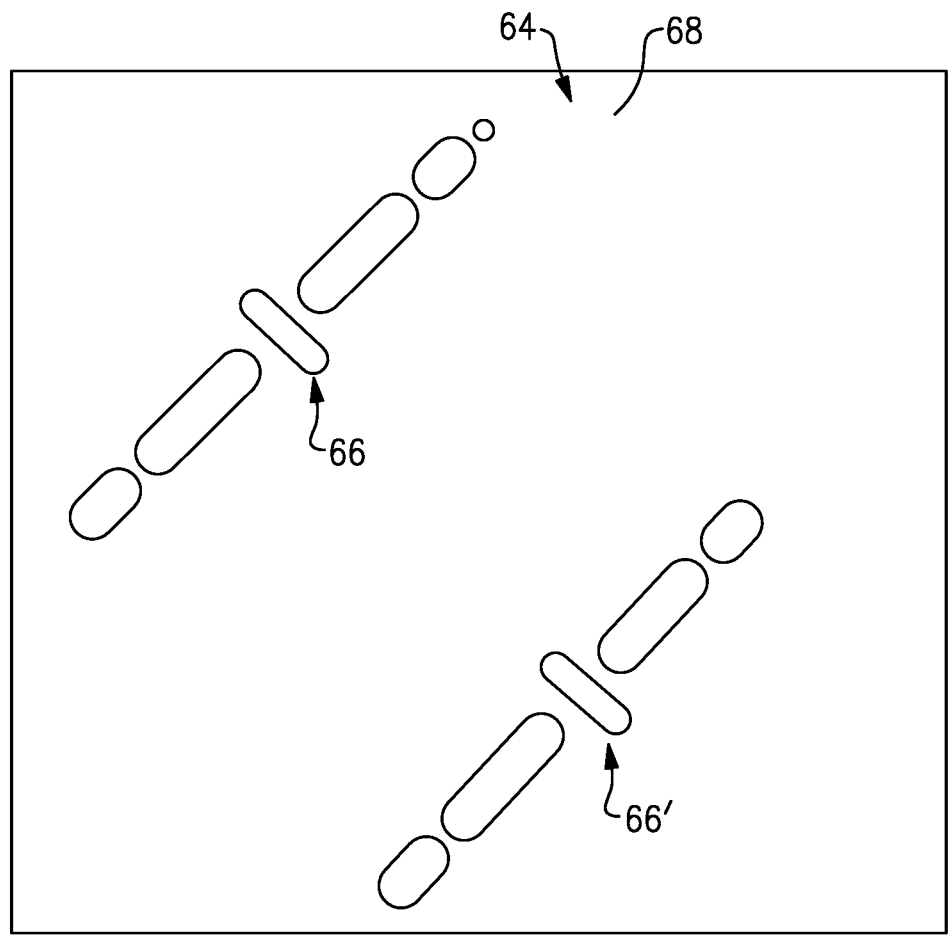
FIG. 5 is a view of a printed circuit board including two slots.

While in FIGS. 3 and 4 only one relay 56 is shown, the PCB 54 could include multiple relays and a corresponding slot for each relay. FIG. 5 illustrates a view of the surface 68 of a PCB 54 including two relays (not shown), which may be arranged in parallel, and two slots 66, 66' arranged as shown in FIGS. 3 and 4 with respect to each relay. Each of the slots 66, 66' is configured to prevent buildup of contaminants from electrically connecting input and output pins of the corresponding relays. The slots 66, 66' are shown as substantial stadium-shapes in FIG. 5. The stadium shapes that extend perpendicular to the slots 66, 66' are solder for connecting the input and output pins of the relays and other electrical connections.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
   interrupting a buildup of carbon deposits on a printed circuit board of a battery charging system configured to selectively charge a battery pack of an electrified vehicle, wherein the buildup of carbon deposits follows a path between an input pin of a relay on the printed circuit board and an output pin of the relay, and wherein the buildup of carbon deposits is interrupted by a slot formed in the printed circuit board, wherein the interrupting step occurs after an expulsion event in which carbon is expelled from the relay and onto the printed circuit board.

2. The method as recited in claim 1, wherein the path is a substantially linear path between the input pin and the output pin.

3. The method as recited in claim 1, wherein the slot is at least 0.03 inches wide.

4. The method as recited in claim 3, wherein the slot is between 0.05 inches and 0.09 inches wide.

5. The method as recited in claim 3, wherein the slot is at least 0.15 inches long.

6. The method as recited in claim 1, wherein the slot extends through an entirety of a thickness of the printed circuit board.

7. The method as recited in claim 1, wherein the battery charging system includes a housing, and the printed circuit board and the relay are within the housing.

8. The method as recited in claim 7, wherein the housing includes a collection area on an opposite side of the printed circuit board as the relay, and the collection area is free of electronic components.

9. The method as recited in claim 7, wherein the housing is mounted to a wall.

10. The method as recited in claim 7, wherein the housing is part of a portable battery charging system.

11. The method as recited in claim 1, wherein, in normal conditions, the relay is configured to transfer power from a power source to the battery pack.

12. A method, comprising:
  interrupting a buildup of carbon deposits on a printed circuit board of a battery charging system configured to selectively charge a battery pack of an electrified vehicle, wherein the buildup of carbon deposits follows a path between an input pin of a relay on the printed circuit board and an output pin of the relay, and wherein the buildup of carbon deposits is interrupted by a slot formed in the printed circuit board,
  wherein the relay is one of two relays mounted to the printed circuit board, wherein both relays are configured to transfer power from a power source to the battery pack, wherein the slot is one of two slots formed in the printed circuit board, wherein each of the relays is mounted adjacent a corresponding one of the slots, and wherein each of the slots is configured to interrupt a buildup of carbon deposits between input and output pins of a corresponding one of the relays.

13. A battery charging system configured to selectively charge a battery pack of an electrified vehicle, comprising:
  a housing;
  a printed circuit board within the housing; and
  a relay within the housing and mounted to the printed circuit board, wherein the relay includes an input pin and an output pin, wherein the printed circuit board includes a slot between the input pin and the output pin configured to interrupt a path formed by a buildup of carbon deposits on the printed circuit board that, in the absence of the slot, would otherwise provide an electrical connection between the input pin and the output pin,
  wherein the housing includes a collection area on an opposite side of the printed circuit board as the relay, and
  wherein the collection area is free of electronic components.

14. The battery charging system as recited in claim 13, wherein the housing is mounted to a wall or part of a portable battery charging system.

15. The battery charging system as recited in claim 13, wherein the slot is at least 0.03 inches wide.

16. The battery charging system as recited in claim 15, wherein the slot is between 0.05 inches and 0.09 inches wide.

17. The battery charging system as recited in claim 15, wherein the slot is at least 0.15 inches long.

18. The battery charging system as recited in claim 13, wherein the slot extends through an entirety of a thickness of the printed circuit board.

19. The battery charging system as recited in claim 13, wherein, in normal conditions, the relay is configured to transfer power from a power source to the battery pack.

* * * * *